United States Patent
Choi et al.

(10) Patent No.: US 9,354,957 B2
(45) Date of Patent: May 31, 2016

(54) METHOD AND APPARATUS FOR CONCEALING ERROR IN COMMUNICATION SYSTEM

(71) Applicant: Samsung Electronics Co., Ltd., Suwon-si, Gyeonggi-do (KR)

(72) Inventors: Seungwon Choi, Suwon-si (KR); Seongwook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/445,619

(22) Filed: Jul. 29, 2014

(65) Prior Publication Data

US 2015/0039979 A1 Feb. 5, 2015

(30) Foreign Application Priority Data

Jul. 30, 2013 (KR) ........................ 10-2013-0089971

(51) Int. Cl.
*G06F 7/02* (2006.01)
*G06F 11/07* (2006.01)
*G10L 19/005* (2013.01)

(52) U.S. Cl.
CPC .......... *G06F 11/0763* (2013.01); *G10L 19/005* (2013.01)

(58) Field of Classification Search
CPC ... G10L 19/005; G10L 19/02; G10L 19/0204; G10L 19/04

USPC ........................................................ 714/821
See application file for complete search history.

(56) References Cited

U.S. PATENT DOCUMENTS

| | | | |
|---|---|---|---|
| 6,418,408 B1 | 7/2002 | Udaya Bhaskar et al. | |
| 6,597,961 B1 * | 7/2003 | Cooke ................. | G10L 19/005 700/94 |
| 7,031,926 B2 | 4/2006 | Makinen et al. | |
| 7,225,380 B2 * | 5/2007 | Toriumi ............... | G10L 19/005 704/E19.003 |
| 7,529,673 B2 | 5/2009 | Makinen et al. | |
| 7,809,556 B2 * | 10/2010 | Goto .................... | G10L 19/005 375/240.01 |
| 2010/0205516 A1 * | 8/2010 | Abudi .................. | H04H 60/12 714/807 |

\* cited by examiner

*Primary Examiner* — David Ton
(74) *Attorney, Agent, or Firm* — Jefferson IP Law, LLP

(57) ABSTRACT

A method and an apparatus for concealing an error of an apparatus for receiving an audio frame in a communication system are provided. The includes determining whether the error occurs in a current audio frame that is received from a transmitter, determining whether the audio frame includes a signal that corresponds to a preset specific frequency when the error occurs, setting a gain of the signal that corresponds to the specific frequency to be lower than a preset limit value if the audio frame includes the signal, and concealing the error of the current audio frame based on a previous audio frame of the audio frame in which the error occurs and the gain of the signal that corresponds to the set specific frequency.

11 Claims, 9 Drawing Sheets

METHOD AND APPARATUS FOR CONCEALING ERROR IN COMMUNICATION SYSTEM

CROSS-REFERENCE TO RELATED APPLICATION(S)

This application claims the benefit under 35 U.S.C. §119(a) of a Korean patent application filed on Jul. 30, 2013 in the Korean Intellectual Property Office and assigned Serial number 10-2013-0089971, the entire disclosure of which is hereby incorporated by reference.

TECHNICAL FIELD

The present disclosure relates to audio data reception in a communication system. More particularly, the present disclosure relates to a method and apparatus for processing a signal when an error occurs in an encoded audio frame.

BACKGROUND

In a digital communication system, an audio signal is encoded into bit streams to be transmitted to a receiving end through a channel. An Adaptive Multi-Rate (AMR) vocoder, which is widely used in a digital communication system, calculates necessary parameters from a signal that is modeled by an auto-regressive process, and then converts the calculated parameters into bit streams to transmit the bit streams. Such bit streams are gathered to form one audio frame, and if a channel state deteriorates during frame transmission, an error may occur.

In general, if an error occurs, parameters of an audio signal that exist in the frame are replaced by errorless parameters extracted from the previous frame. This is to minimize deterioration of the sound quality through concealment of the audio signal parameters in the frame where the error exists, and there is a need for a method capable of heightening a reception performance of the audio signal through removal or weakening of components of a specific band or a desired band in consideration of person's perception.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus, which can heighten a reception performance of an audio signal through removal or weakening of components of a specific band or a desired band when an error occurs in an encoded audio frame.

In accordance with an aspect of the present disclosure, a method for concealing an error of an apparatus for receiving an audio frame in a communication system is provided. The method includes determining whether the error occurs in a current audio frame that is received from a transmitter, determining whether the audio frame includes a signal that corresponds to a preset specific frequency when the error occurs, setting a gain of the signal that corresponds to the specific frequency to be lower than a preset limit value if the audio frame includes the signal, and concealing the error of the current audio frame based on a previous audio frame of the audio frame in which the error occurs and the gain of the signal that corresponds to the set specific frequency.

In accordance with another aspect of the present disclosure, an apparatus for receiving an audio frame that conceals an error in a communication system is provided. The apparatus includes a receiving unit configured to receive the audio frame transmitted from a transmitter, and a compensation unit configured to determine whether the error occurs in a current audio frame that is received from the transmitter, to determine whether the audio frame includes a signal that corresponds to a preset specific frequency when the error occurs, to set a gain of the signal that corresponds to the specific frequency to be lower than a preset limit value if the audio frame includes the signal, and to conceal the error of the current audio frame based on a previous audio frame of the audio frame in which the error occurs and the gain of the signal that corresponds to the set specific frequency.

According to the present disclosure, the reception performance of the audio signal can be heightened through removal or weakening of the components of the specific band or the desired band when the error occurs in the encoded audio frame.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
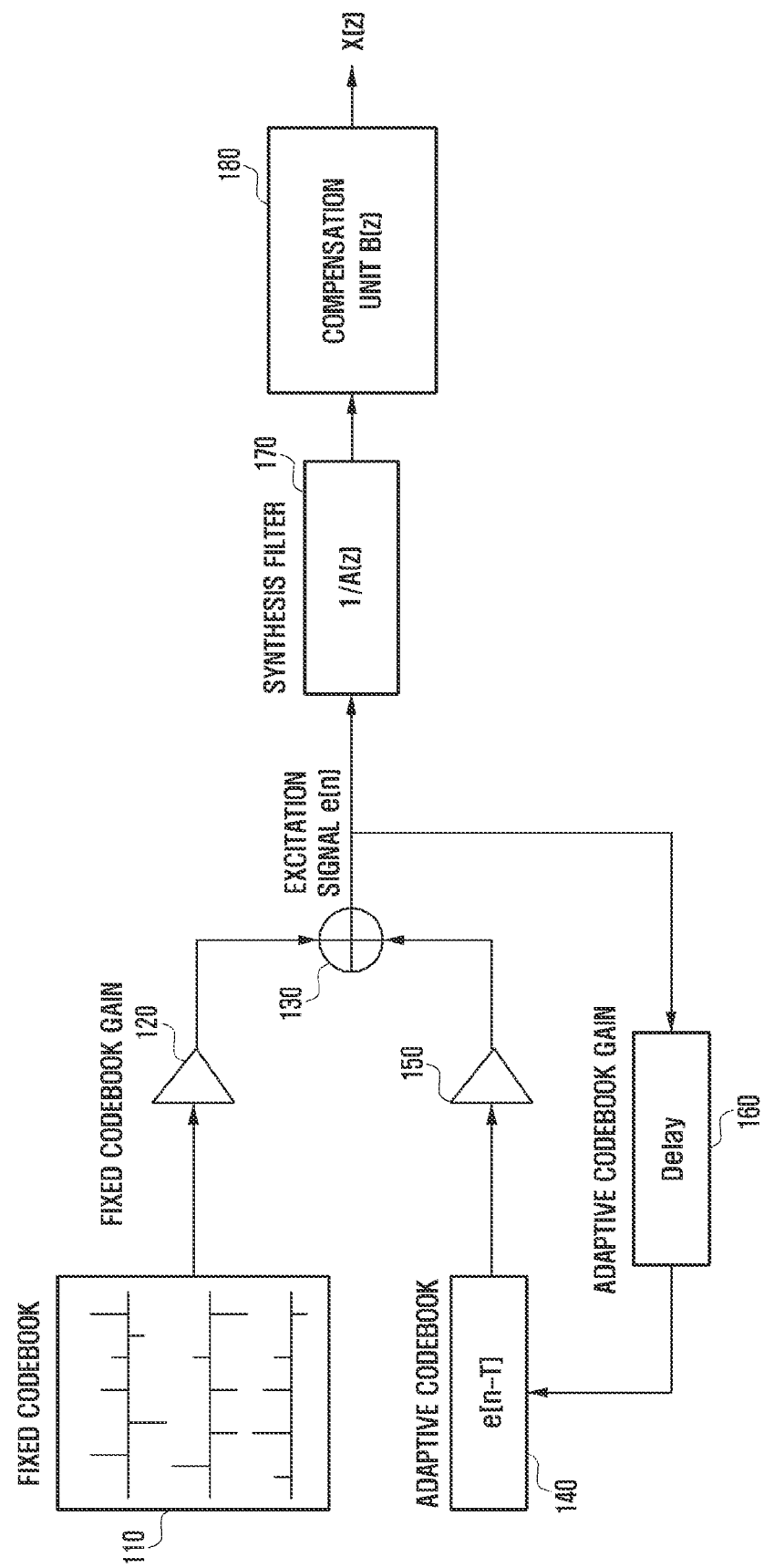
FIG. 1 is a block diagram illustrating an internal configuration of an apparatus for receiving an audio frame according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a digital communication system, an audio signal is encoded into bit streams to be transmitted to a receiving end through a channel. When transmitting the signal, a transmitting end encodes each frame of the audio signal to at least one parameter to transmit the parameters. A decoder of the receiving end generates an audio signal that a person can hear through synthesis of the received parameters.

Most widely used parameters may include a frequency parameter, a Long-Term Prediction (LTP) variable, a gain parameter, and an excitation parameter. The frequency parameter is also called Linear Predictive Coding (LPC), and is obtained through modeling of the frequency characteristics of the vocal tract. In particular, the frequency parameter is used to express the spectrum characteristics of an audio signal for a short time. The LPC variable may be expressed using Line Spectrum Frequencies (LSFs).

As described above, if the state of a communication channel deteriorates, a frame error occurs. This frame error may be classified into a lost frame and a corrupted frame.

In a packet-based transmission system, such as the Internet protocol, transmitted data may arrive late. In a case of an audio signal that is targeted for real-time transmission, a frame that is transmitted late is unable to be used, and thus it may be considered that the corresponding frame is not transmitted. On the other hand, a case where the frame is transmitted in time but some parameters for expressing the audio signal are corrupted may frequently occur in the circuit-based transmission system.

According to the European Telecommunications Standards Institute (ETSI) standards (ETSI TS 126 091), in a case where a frame that has an error is transmitted, variables of the frame that has the error are replaced by the variables of the previous frame, and the details thereof may be represented by Equation 1 below.

$$g^P = \begin{cases} P(\text{state})g^P(-1), & g^P(-1) \leq \text{median5} \\ & (g^P(-1), \ldots, g^P(-5)) \\ P(\text{state})\text{median5} & g^P(-1) > \text{median5} \\ (g^P(-1), \ldots, g^P(-5)), & (g^P(-1), \ldots, g^P(-5)) \end{cases} \quad \text{Equation 1}$$

$$g^c = \begin{cases} C(\text{state})g^c(-1), & g^c(-1) \leq \text{median5} \\ & (g^c(-1), \ldots, g^c(-5)) \\ C(\text{state})\text{median5} & g^c(-1) > \text{median5} \\ (g^c(-1), \ldots, g^c(-5)), & (g^c(-1), \ldots, g^c(-5)) \end{cases}$$

In Equation 1, $g^P$ denotes an adaptive codebook gain (or LTP gain) of a current frame, and $g^P$ denotes a fixed codebook gain of the current frame. $g^P(-1), \ldots, g^P(-5)$ and $g^c(-1), \ldots, g^c(-5)$ denote the adaptive codebook gain and the fixed codebook gain that are used for five previous frames.

As seen in Equation 1, according to the current standards, a median value of the gain that is used for the five previous frames is obtained, and the current gain value is obtained by multiplying the median value by an attenuation factor P (state) or C (state) according to a state variable. In this case, values of P (state) and C (state) are defined as in Equation 2 below.

$$P(1)=0.98, P(3)=0.8, P(4)=0.3, P(5)=0.2, P(6)=0.2, C(1)= \\ 0.98, C(2)=0.98, C(3)=0.98, C(4)=0.98, C(5)= \\ 0.98, C(6)=0.7 \quad \text{Equation 2}$$

As the state value increases (i.e., as a Bad Frame Indicator (BFI) is successively generated), the gain attenuation increases.

A LINE Spectral Frequency (LSF) is calculated as in Equation 3 below using an average value of the LSF of the previous frame that is received without an error and the already known LSF.

$$\text{lsf\_q1}(i)=\text{lsf\_q2}(i)=\alpha\text{past\_lsf\_q}(i)+(1-\alpha)\text{mean\_lsf}(i), \\ i=0, \ldots, N \quad \text{Equation 3}$$

Here, α denotes α=0.95, lsf_q1 and lsf_q2 denote LSF vectors of the current frame, past_lsf_q denotes lsf_q2 of the previous frame, and mean_lsf denotes an average of the LSF vectors. N denotes the order of a linear predictive filter, and is defined as N=10 according to the standards.

According to the standards as described above, the same concealment algorithm is always used regardless of whether the frame having the error is the lost frame or the corrupted frame.

In a case of the frame having corrupted information, however, replacement of all the parameters by the variables of the previous frame may be inefficient since even the variables received without error are replaced.

Accordingly, as another method for concealing an error that can overcome the above-described problem, a method may be considered which (1) determines whether information of the current frame is stationary or non-stationary, and (2) uses parameter values of the current frame when updating the parameters if the frame is non-stationary and corruption of the information is not high.

As described above, all the techniques proposed for error concealment are focused on the calculation of the LSF values to design a synthesis filter 1/A(z). In order to heighten the reception performance of the audio signal, however, signal processing subsequent to the synthesis filter should be investigated.

The error concealment algorithm is basically to continuously maintain the information of the previous frame, and if the previous frame includes information of an undesired or perceptibly bad frequency range, components of such a region are also continuously maintained.

Accordingly, embodiments of the present disclosure propose a method and apparatus for receiving a sound that can overcome the above-described issues.

In order for a receiving end to conceal a frame having an error, unlike the method and apparatus in the related art, the present disclosure provides a method and apparatus that can improve the sound quality through removal or weakening of components of a specific band or a desired band in consideration of human perception.

FIG. 1 is a block diagram illustrating the internal configuration of an apparatus for receiving an audio frame according to an embodiment of the present disclosure.

Referring to FIG. 1, an apparatus for receiving an audio frame according to the present disclosure includes a filter that can remove signal components of a specific band (LSF) to be described in detail hereinafter.

A source-filter audio model according to an embodiment of the present disclosure may be presented using excitation (e(n)) signals having the same characteristic and a synthesis filter 1/A(z) that shows the frequency characteristics of various kinds of sound.

The transmitting end configures one codebook through quantization of the characteristics according to the sound and transmits only an index of a codeword that minimizes a difference between the original sound and the synthesized sound.

A fixed codebook 110 illustrated in FIG. 1 refers to the same codebook as the codebook that is used for the transmitting end to send the excitation signal. The apparatus for receiving an audio frame selects a codeword that can minimize the reception error in the fixed codebook 110. A codeword selected in the fixed codebook 110 is amplified with a gain of the fixed codebook by a fixed codebook amplifier 120 and then is input to an adder 130.

An adaptive codebook 140 is used to perform modeling of an excitation signal that is generated in the previous frame. In general, since the excitation signal is affected by the excitation signal of the previous frame 160, the apparatus for receiving an audio frame according to the present disclosure uses the adaptive codebook 140 to perform modeling of the excitation signal that is generated in the previous frame. The excitation signal that is modeled by the fixed codebook 140 is amplified with the gain of the adaptive codebook by an adaptive codebook amplifier 150 to be input to the adder 130.

A synthesis filter 170 is a frequency synthesis filter that considers the frequency characteristics of sound.

In a case where an error occurs in an audio frame and restoration thereof is performed, a compensation unit 180 operates so that a signal that corresponds to a preset specific frequency (or frequency band) is not reflected in the restoration process of the current frame.

For this, the compensation unit 180 determines whether the error occurs in the current audio frame that is received from the transmitter, and determines whether the audio frame includes the signal that corresponds to the preset specific frequency if the error occurs. If the audio frame includes the signal as a result of determination, the compensation unit 180 sets the gain of the signal that corresponds to the specific frequency to be lower than a preset limit value. The compensation unit 180 conceals the error of the current audio frame based on a previous audio frame of the audio frame in which the error occurs and the gain of the signal that corresponds to the set specific frequency.

For the error concealment, the compensation unit 180 operates to replace the current audio frame by the previous audio frame of the audio frame in which the error occurs based on the gain of the signal that corresponds to the set specific frequency.

The compensation unit 180 calculates the gain of the signal that corresponds to all the frequencies included in the current frame, and determines whether there is a frequency having a gain that is equal to or higher than the preset limit value as the result of the calculation. If the frequency exists as the result of the determination, the compensation unit 180 sets the gain of the signal that corresponds to the frequency having the gain that is equal to or higher than the preset limit value to be lower than the preset limit value.

If the frequency having the gain that is equal to or higher than the preset limit value exists as the result of the calculation, the compensation unit 180 may replace the current audio frame by the previous audio frame of the audio frame in which the error occurs.

Although the apparatus for receiving an audio frame according to an embodiment of the present disclosure as illustrated in FIG. 1 is additionally provided with the compensation unit (B(z)) 180 based on the CELP decoder, it is also possible to add B(z) to the output of a decoder according to various coding techniques to obtain the same effect.

Figure 2:
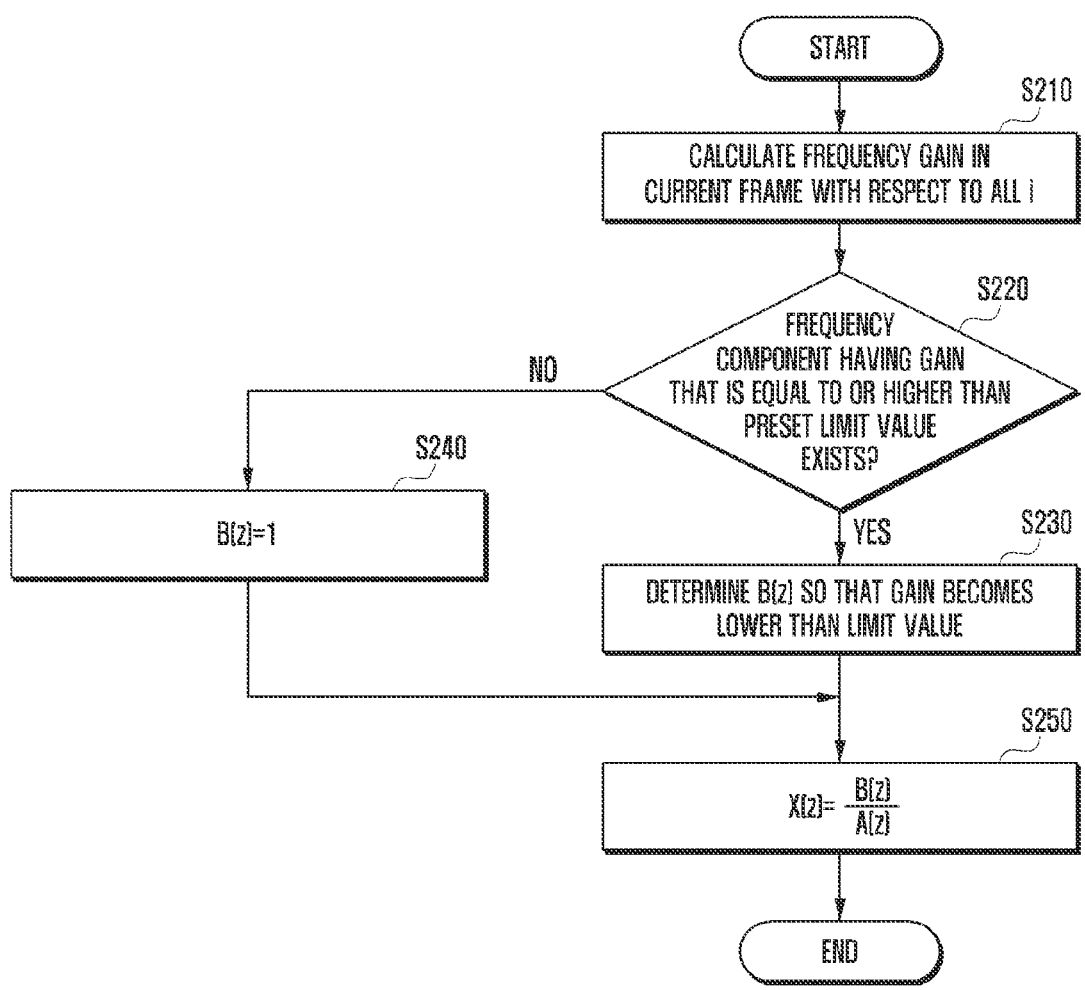
FIG. 2 is a flowchart illustrating an error concealing process of an apparatus for receiving an audio frame according to an embodiment of the present disclosure.

FIG. 2 is a flowchart illustrating an error concealing process of an apparatus for receiving an audio frame according to an embodiment of the present disclosure. According to an embodiment of the present disclosure, the compensation unit 180, among respective blocks that constitute the apparatus for receiving an audio frame as illustrated in FIG. 1, may perform the following process.

Referring to FIG. 2, at operation S210, the apparatus for receiving an audio frame calculates a frequency gain in the current frame with respect to all indexes included in the LSF set to be weakened or removed.

At operation S220, the apparatus for receiving an audio frame determines whether there is a frequency component having a gain that is equal to or higher than a preset limit value based on the calculated frequency gain. This will be described in detail with reference to FIGS. 3A and 3B.

Figure 3A:
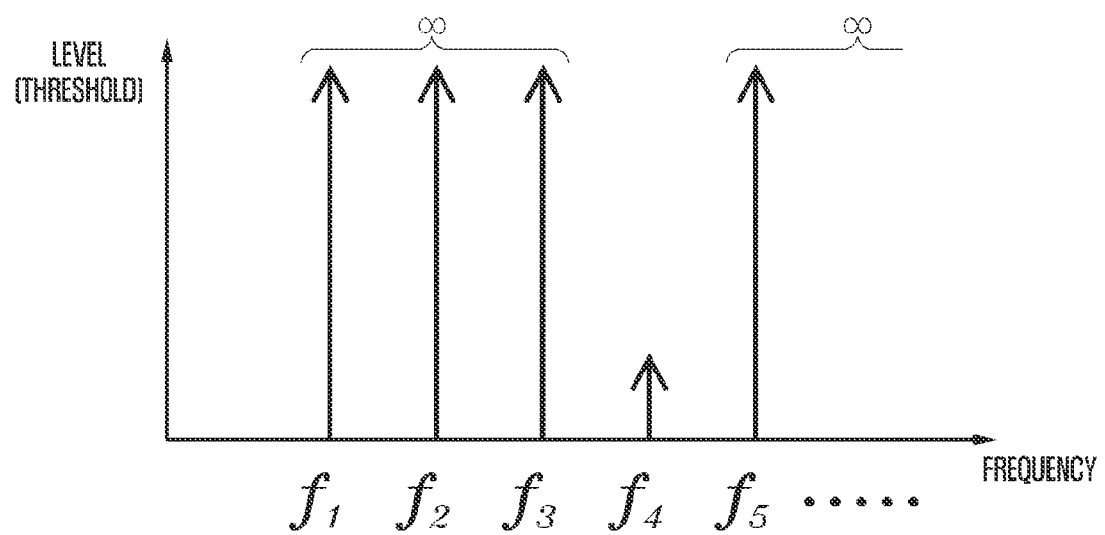
FIGS. 3A and 3B are diagrams explaining a process of determining whether there exists a frequency component having a gain that is equal to or higher than a preset limit value according to an embodiment of the present disclosure.
Figure 3B:
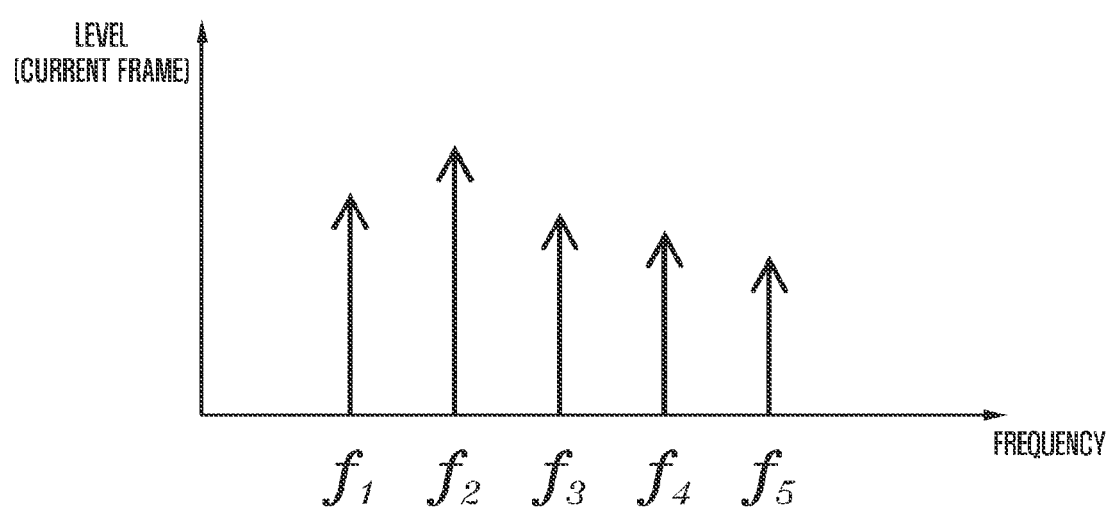

FIGS. 3A and 3B are diagrams explaining a process of determining whether there exists a frequency component having a gain that is equal to or higher than a preset limit value according to an embodiment of the present disclosure Referring to FIGS. 3A and 3B, the apparatus for receiving an audio frame may predetermine limit values for frequencies to be used when the error is concealed. FIG. 3A illustrates that different limit values are set according to frequencies f1 to f5. With respect to the specific frequency f4 that is set by the apparatus for receiving an audio frame or a user, an extremely low limit value may be set in comparison to other frequencies. With respect to the remaining frequencies f1, f2, f3, and f5 that are not specially set, a high limit value (e.g., infinity) may be set.

Frequency gains for the respective frequencies in the current frame that are calculated as the result of performing operation S210 are illustrated in FIG. 3B.

Referring again to operation S220 of FIG. 2, the apparatus for receiving an audio frame compares limit values for respective preset frequencies as illustrated in FIG. 3A with gains for respective frequencies in the current frame as illustrated in FIG. 3B, and determines whether a frequency component having a gain that is equal to or higher than a preset limit value exists in the current frame.

If the frequency component exists, the apparatus for receiving an audio frame determines a compensation filter B(z) at operation S230 so that the gain becomes lower than the preset limit value. The compensation filter B(z) may be designed as in Equation 4 below.

$$B(z) = \prod_{i \in I} \left(1 - a_j e^{j2\pi \tilde{w}_i T} z^{-1}\right) \quad \text{Equation}$$

Here, I denotes an index of the LSF to be weakened or removed, $a_j$ and $\tilde{w}_i$ denote variable values that should be designed depending on whether the i-th LSF component is to be removed or weakened to a specific level. If the frequency component does not exist, then at operation S240 the compensation filter B(z) is set to 1.

At operation S250, the apparatus for receiving an audio frame outputs a final output signal X(z) based on the synthesis filter A(z) and the compensation filter B(z).

An example in which the apparatus for receiving an audio frame according to an embodiment of the present disclosure may be used is described below with reference to FIGS. 4 and 5.

Figure 4:
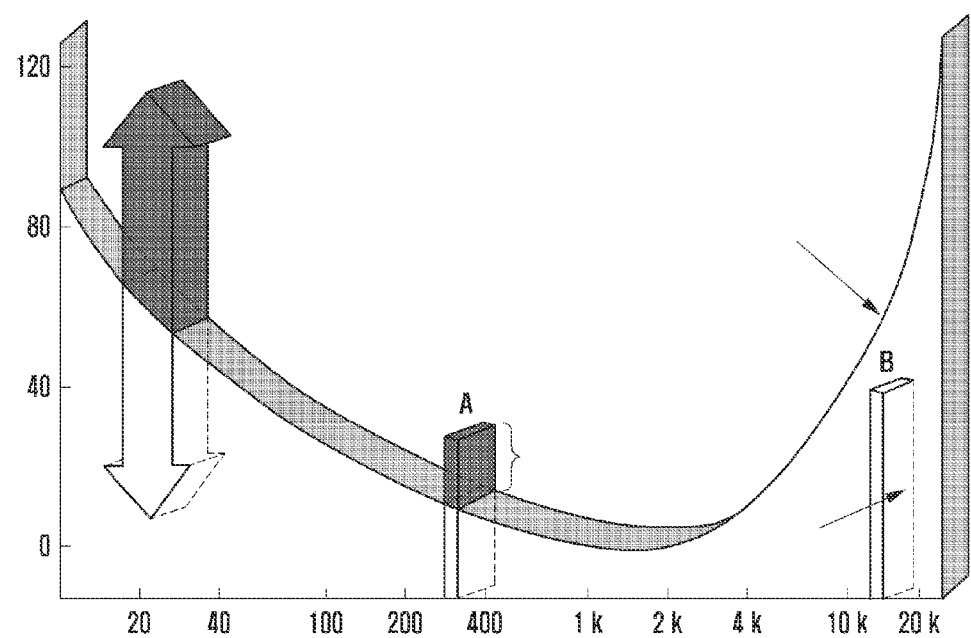
FIG. 4 is a diagram illustrating the minimum signal strength that a person can hear with respect to each frequency band according to an embodiment of the present disclosure.
Figure 5:
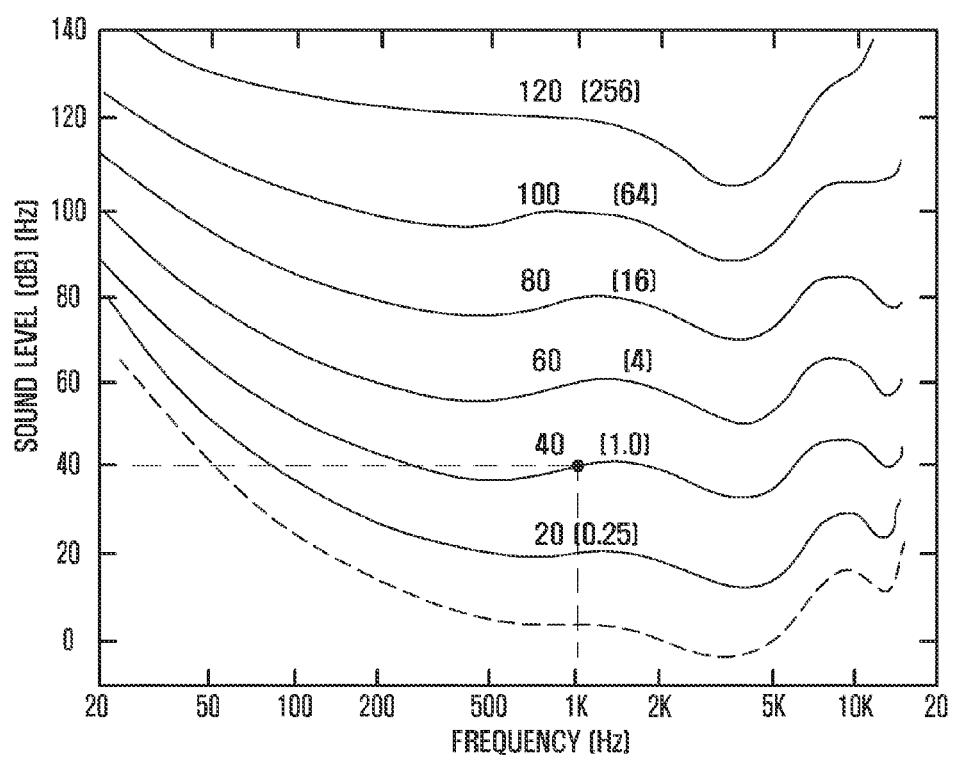
FIG. 5 is a diagram illustrating actual dB values so as to have the same loudness level of sound in response to frequencies according to an embodiment of the present disclosure.

FIG. 4 is a diagram illustrating the minimum signal strength that a person can hear with respect to each frequency band, and FIG. 5 is a diagram illustrating actual dB values so as to have the same loudness level of sound in response to frequencies.

Referring to FIGS. 4 and 5, it can be known that the human perception is most sensitive in the frequency range of 1 to 4 kHz.

In general, in a case of an alarm clock, the alarm effect may be maximized through inclusion of the frequency component in the frequency range of 1 to 4 kHz, to which the human auditory sense becomes most sensitive, in alarm sound.

This fact can be applied to the apparatus for receiving an audio frame according to the present disclosure. By removing or weakening the gain values of the LSF components that correspond to 1 to 4 kHz, a signal that is soft or pleasant to the human ear can be generated.

For example, the LSF components that correspond to the frequency range of 1 to 4 kHz may be included in a specific frame in which an alarm signal is necessarily included. In this case, if an error occurs in the following frame, the previous frame is referred to in order to conceal the error, and thus the LSF components that correspond to the frequency range of 1 to 4 kHz, which have been included for the alarm, may be reflected in the process of concealing an error of the current frame. This may cause a result that is not intended by the user.

According to embodiments of the present disclosure, the preset specific frequency component is not reflected in the error concealment process, and thus the reception performance of the audio signal can be heightened.

Figure 6A:
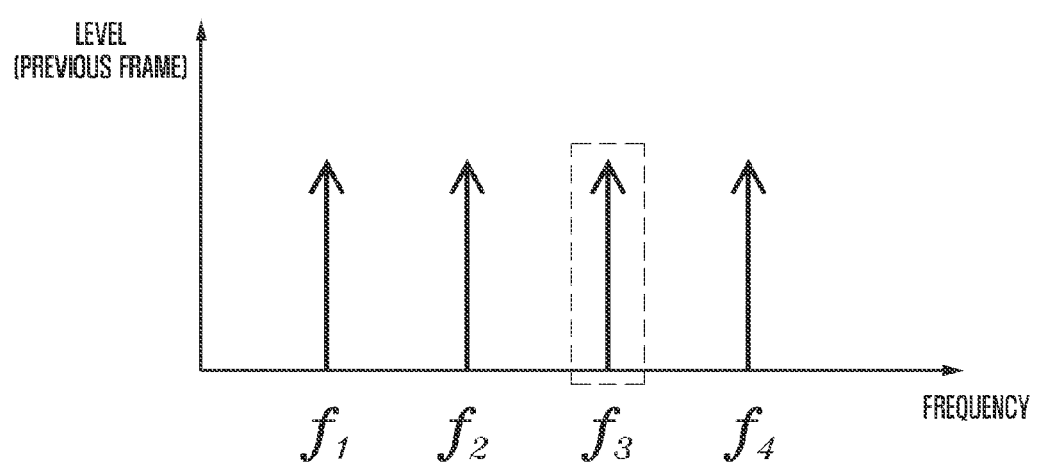
FIGS. 6A, 6B, and 6C are diagrams illustrating a difference between methods for receiving an audio signal and concealing an error in the related art and according to an embodiment of the present disclosure.
Figure 6B:
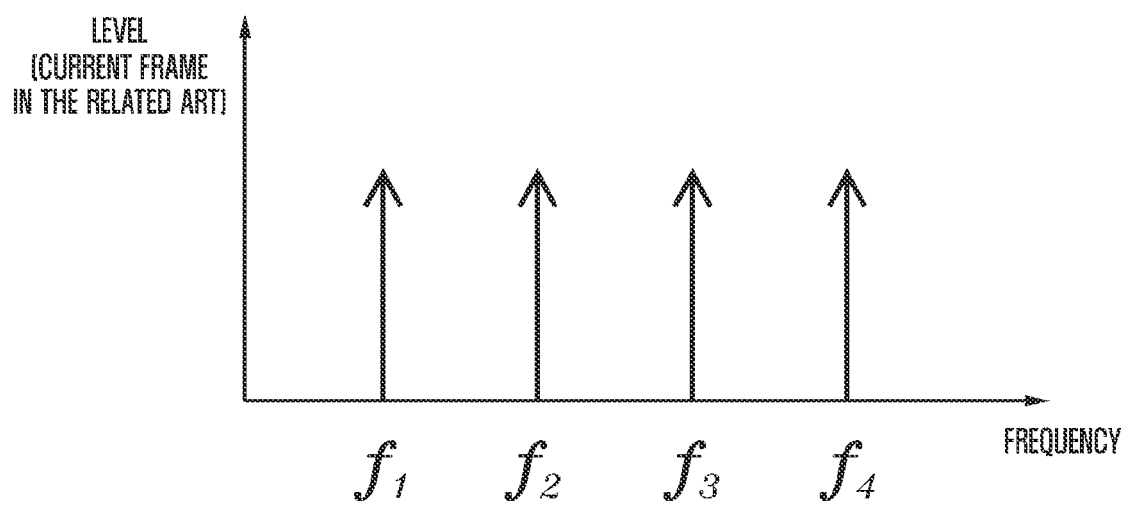
Figure 6C:
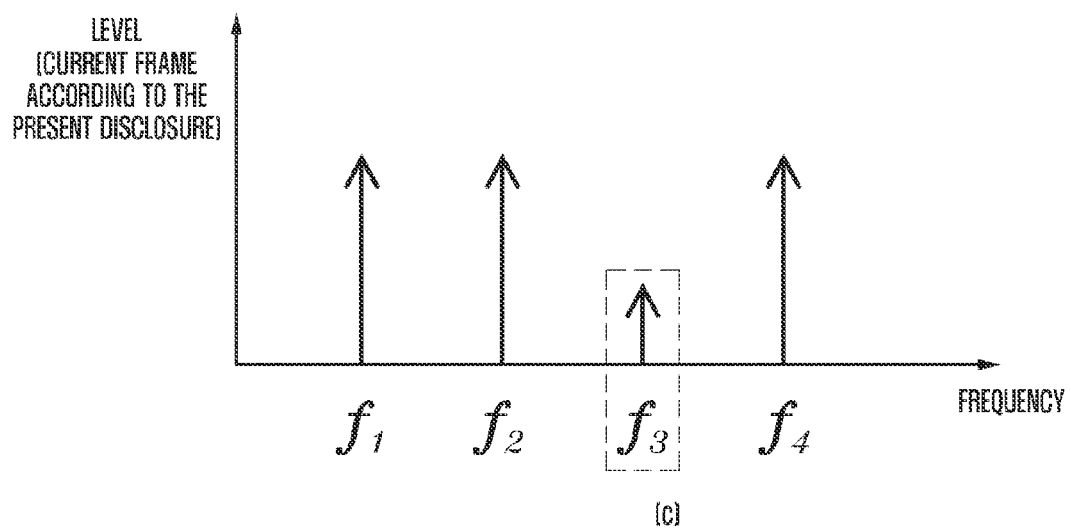

FIGS. 6A to 6C are diagrams illustrating a difference between methods for receiving an audio signal and concealing an error in the related art and according to an embodiment of the present disclosure.

Referring to FIGS. 6A to 6C, the level of a signal for respective frequencies in the previously received frame based on the currently received frame is illustrated in FIG. 6A. If it is assumed that the frequency that is sensitive to a person is f3 in FIG. 6A, it can be confirmed that the signal that corresponds to the corresponding frequency f3 is included in the previous frame due to the alarm signal of the alarm clock.

FIG. 6B is a diagram explaining a method for concealing an error in the current frame in the related art. If an error occurs in the current frame and the apparatus for receiving an audio frame performs an error concealment operation in the current frame, the error of the current frame is concealed in consideration of the previous frame in the related art. In this case, although the frequency f3 according to the alarm signal should be included in the previous frame only, the frequency f3 still exists in the current frame according to the error concealment operation of the current frame. This may cause a result that is not intended by the user.

FIG. 6C is a diagram explaining a method for concealing an error in the current frame according to an embodiment of the present disclosure. The apparatus for receiving an audio frame according to the present disclosure defines limit values set according to respective frequencies and does not reflect the specific frequency that is preset by the user or the apparatus in the current frame when the error concealment operation is performed. Accordingly, as illustrated in FIG. 6C, the apparatus for receiving an audio frame according to the present disclosure weakens the signal that corresponds to the preset frequency f3 to restore the audio signal when the error concealment operation is performed.

According to embodiments of the present disclosure, the components of the specific band or the desired band in the encoded audio frame are removed or weakened when an error occurs, and thus the reception performance of the audio signal can be heightened.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for concealing an error of an apparatus for receiving an audio frame in a communication system, the method comprising:

determining whether the error occurs in a current audio frame that is received from a transmitter;

determining whether the audio frame includes a signal that corresponds to a preset specific frequency when the error occurs;

setting a gain of the signal that corresponds to the specific frequency to be lower than a preset limit value if the audio frame includes the signal; and concealing the error of the current audio frame based on a previous audio frame of the audio frame in which the error occurs and the gain of the signal that corresponds to the set specific frequency.

2. The method of claim 1, wherein the concealing comprises replacing the current audio frame by the previous audio frame of the audio frame in which the error occurs based on the gain of the signal that corresponds to the set specific frequency.

3. The method of claim 1, wherein the determining of whether the audio frame includes the signal comprises:
calculating gains of signals that correspond to all frequencies included in the current frame;
determining whether a frequency having a gain that is equal to or higher than the preset limit value exists based on the result of the calculation; and
setting the gain of the signal that corresponds to the frequency having the gain that is equal to or higher than the preset limit value to be lower than the preset limit value if the frequency having the gain that is equal to or higher than the preset limit value exists.

4. The method of claim 3, wherein the determining of whether the audio frame includes the signal further comprises:
replacing the current audio frame by the previous audio frame of the audio frame in which the error occurs if the frequency having the gain that is equal to or higher than the preset limit value does not exist as the result of the calculation.

5. The method of claim 1, wherein the preset specific frequency is in a frequency range of 1 to 4 kHz.

6. A non-transitory computer-readable storage medium storing instructions that, when executed, cause at least one processor to perform the method of claim 1.

7. An apparatus for receiving an audio frame that conceals an error in a communication system, the apparatus comprising:
a receiving unit configured to receive the audio frame transmitted from a transmitter; and
a compensation unit configured to determine whether the error occurs in a current audio frame that is received from the transmitter, to determine whether the audio frame includes a signal that corresponds to a preset specific frequency when the error occurs, to set a gain of the signal that corresponds to the specific frequency to be lower than a preset limit value if the audio frame includes the signal, and to conceal the error of the current audio frame based on a previous audio frame of the audio frame in which the error occurs and the gain of the signal that corresponds to the set specific frequency.

8. The apparatus of claim 7, wherein the compensation unit is further configured to replace the current audio frame by the previous audio frame of the audio frame in which the error occurs based on the gain of the signal that corresponds to the set specific frequency.

9. The apparatus of claim 7, wherein the compensation unit calculates gains of signals that correspond to all frequencies included in the current frame, determines whether a frequency having a gain that is equal to or higher than the preset limit value exists based on the result of the calculation, and sets the gain of the signal that corresponds to the frequency having the gain that is equal to or higher than the preset limit value to be lower than the preset limit value if the frequency having the gain that is equal to or higher than the preset limit value exists.

10. The apparatus of claim 9, wherein the compensation unit is further configured to replace the current audio frame by the previous audio frame of the audio frame in which the error occurs if the frequency having the gain that is equal to or higher than the preset limit value does not exist as the result of the calculation.

11. The apparatus of claim 7, wherein the preset specific frequency is in a frequency range of 1 to 4 kHz.

\* \* \* \* \*